(12) United States Patent
Tamura

(10) Patent No.: US 11,099,720 B2
(45) Date of Patent: Aug. 24, 2021

(54) DISPLAY CONTROL DEVICE AND NON-TRANSITORY COMPUTER READABLE MEDIUM STORING DISPLAY CONTROL PROGRAM

(71) Applicant: FUJIFILM Business Innovation Corp., Tokyo (JP)

(72) Inventor: Junichi Tamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/914,462

(22) Filed: Jun. 28, 2020

(65) Prior Publication Data

US 2021/0208743 A1 Jul. 8, 2021

(30) Foreign Application Priority Data

Jan. 8, 2020 (JP) .............................. JP2020-001595

(51) Int. Cl.
*G06F 3/0482* (2013.01)

(52) U.S. Cl.
CPC .................. *G06F 3/0482* (2013.01)

(58) Field of Classification Search
CPC .................... G06F 3/048; G06F 3/05
See application file for complete search history.

(56) References Cited

U.S. PATENT DOCUMENTS

| | | | | |
|---|---|---|---|---|
| 2006/0156222 A1* | 7/2006 | Chi | ........................ | G06F 16/30 715/231 |
| 2006/0288280 A1* | 12/2006 | Makela | ................. | G06F 16/955 715/205 |
| 2012/0130819 A1* | 5/2012 | Willcock | ........... | G06Q 30/0269 705/14.66 |
| 2013/0346875 A1* | 12/2013 | Klein | ................. | H04N 21/4532 715/745 |
| 2014/0006934 A1* | 1/2014 | Wang | .................. | G06F 16/9577 715/235 |
| 2014/0245180 A1* | 8/2014 | Kuramura | .............. | G06Q 10/10 715/753 |
| 2014/0372871 A1* | 12/2014 | Song | ..................... | G06F 16/957 715/234 |
| 2015/0058417 A1* | 2/2015 | McConnell | .......... | H04L 67/306 709/204 |
| 2015/0205462 A1* | 7/2015 | Jitkoff | .................. | G06F 16/955 715/777 |
| 2016/0026641 A1* | 1/2016 | Young | .................... | G06Q 50/01 707/734 |
| 2016/0292641 A1* | 10/2016 | Liu | ..................... | G06Q 10/1053 |
| 2017/0075528 A1* | 3/2017 | Kothari | ................. | G06F 3/0483 |
| 2018/0189282 A1* | 7/2018 | Hartlaub | ............... | G06F 16/437 |
| 2019/0297143 A1* | 9/2019 | Anadon | ................ | H04L 67/146 |
| 2020/0301571 A1* | 9/2020 | Sandu | .................. | G06F 3/0482 |

FOREIGN PATENT DOCUMENTS

JP 2017194790 10/2017

* cited by examiner

*Primary Examiner* — Daniel Rodriguez
(74) *Attorney, Agent, or Firm* — JCIPRNET

(57) ABSTRACT

A display control device includes a processor configured to specify an emphasis item that a viewer viewing profile information of a first user desires to emphasize out of the profile information, the first user using a service with which the profile information is registered, from an operation history of the viewer, and perform a display control of displaying the emphasis item with priority over other items, in a case where the viewer views profile information of a second user.

20 Claims, 16 Drawing Sheets

DISPLAY CONTROL DEVICE AND NON-TRANSITORY COMPUTER READABLE MEDIUM STORING DISPLAY CONTROL PROGRAM

CROSS-REFERENCE TO RELATED APPLICATIONS

This application is based on and claims priority under 35 USC 119 from Japanese Patent Application No. 2020-001595 filed Jan. 8, 2020.

BACKGROUND

(i) Technical Field

The present invention relates to a display control device and a non-transitory computer readable medium storing a display control program.

(ii) Related Art

JP2017-194790A discloses a hospital search system for medical personnel in which a terminal is connected to a server via the Internet, which includes a search unit that searches medical condition items and general search items, a display setting unit that enables setting of display items, with respect to the search result searched by the search unit, and a list display unit that displays the items set by the display setting unit in a list, and the list display unit separately displays applicable items and non-applicable items for the search result.

SUMMARY

In a service such as a matching service with which profile information is registered, as a display control for displaying the profile information, for example, a display control is considered in which an emphasis item is displayed with priority over other items in a case where a viewer who views the profile information designates the emphasis item that is desired to be emphasized out of the profile information.

Here, in a case where the viewer who views the profile information of the first user designates an emphasis item, and in a case where it is necessary to designate the emphasis item again in a case where the viewer views the profile information of the second user, it takes time to view the emphasis item.

Aspects of non-limiting embodiments of the present disclosure relate to a display control device and a non-transitory computer readable medium storing a display control program that enable a viewer to view an emphasis item efficiently in a case where the viewer views profile information of a second user, as compared with a configuration in which the emphasis item is displayed with priority over other items only in a case where the viewer views the profile information of a first user.

Aspects of certain non-limiting exemplary embodiments of the present disclosure overcome the above disadvantages and/or other disadvantages not described above. However, aspects of the non-limiting exemplary embodiments are not required to overcome the disadvantages described above, and aspects of the non-limiting exemplary embodiments of the present disclosure may not overcome any of the disadvantages described above.

According to an aspect of the present disclosure, there is provided a display control device including a processor configured to specify an emphasis item that a viewer viewing profile information of a first user desires to emphasize out of the profile information, the first user using a service with which the profile information is registered, from an operation history of the viewer, and perform a display control of displaying the emphasis item with priority over other items, in a case where the viewer views profile information of a second user.

BRIEF DESCRIPTION OF THE DRAWINGS

Exemplary embodiment(s) of the present invention will be described in detail based on the following figures, wherein.

DETAILED DESCRIPTION

Hereinafter, an example of exemplary embodiments of the present invention will be described in detail with reference to the accompanying drawings.

First Exemplary Embodiment

Information Processing System 10

Figure 1:
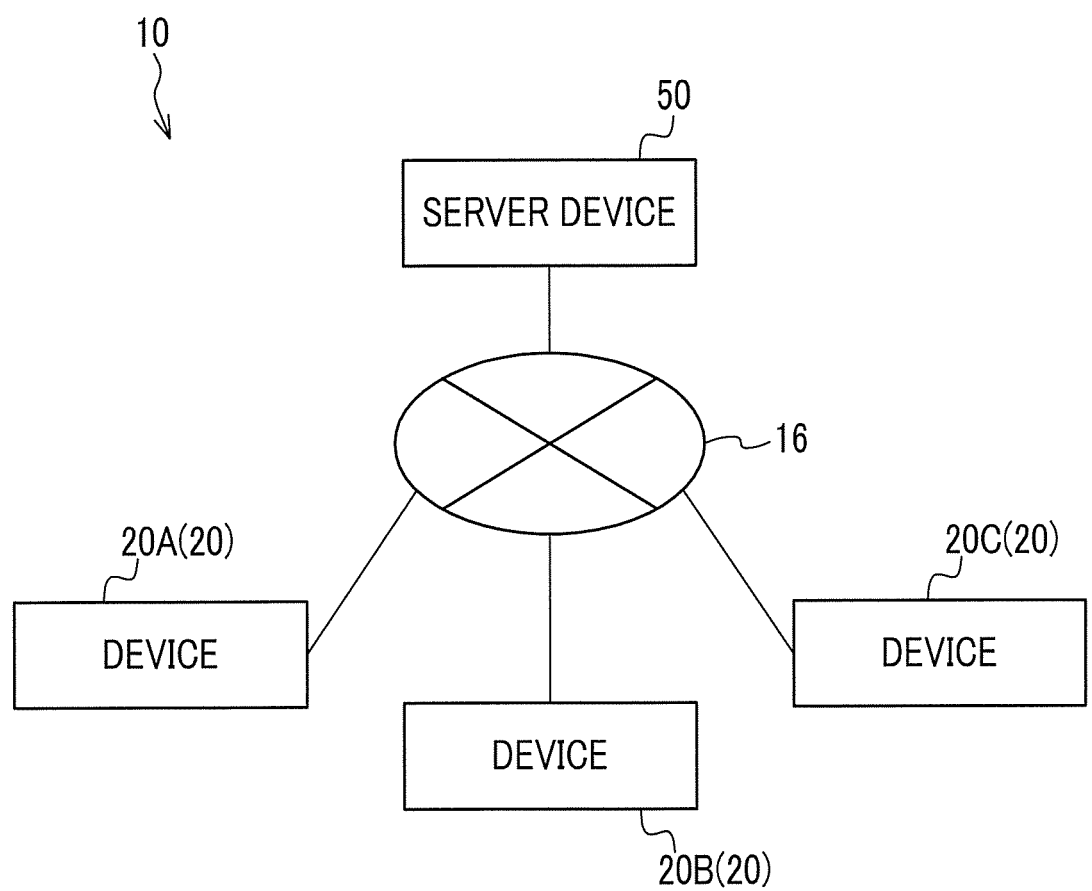
FIG. 1 is a schematic diagram illustrating an example of a configuration of an information processing system according to a first exemplary embodiment.

First, an example of the configuration of an information processing system 10 according to the present exemplary embodiment will be described. FIG. 1 is a schematic diagram illustrating the configuration of the information processing system 10 according to the present exemplary embodiment.

The information processing system 10 is a system for processing information, and includes a server device 50 and a plurality of devices 20, as illustrated in FIG. 1. Specifically, the information processing system 10 is a system that allows a user to register a profile with the server device via the devices 20. The profile indicates profile information, and the profile information is information about the user (for example, personal information such as age).

More specifically, the information processing system 10 is a system in which another user views the profile registered with the server device 50 by the user, via the device 20, and the users have an opportunity to know each other or communicate with each other. Here, the users mean all persons who use the information processing system 10. Therefore, the users include users who are registered with the information processing system 10 (server device 50) and users who are not registered.

The server device 50 and the plurality of devices 20 are communicably connected to each other, for example, via a wireless communication line 16 such as the Internet. Although FIG. 1 illustrates three devices 20A, 20B, and 20C as the plurality of devices 20, the number of devices is not limited. The devices 20A, 20B, and 20C are collectively referred to as the device 20.

Device 20

The device 20 is a terminal used by a user. Specifically, the device 20 is a device for the user to use the service provided by the server device 50. More specifically, as the device 20, for example, a personal computer, a tablet computer, a smartphone, a mobile phone, or the like is used.

Server Device 50

The server device 50 is an example of a display control device. As described above, the server device 50 is a device that provides the user with a service whose profile is registered via the device 20. Specifically, the server device 50 is a device that provides a service that allows other users to view the profile registered by the user through the device 20 and gives the users an opportunity to know each other and communicate with each other (a so-called matching service, including a business matching that connects users looking for jobs and recruiters of the company, a dating matching service for searching for contacts, or the like). Hereinafter, the service provided by the server device 50 is referred to as "providing service".

The server device 50 has, for example, a medium (for example, a web page) that allows other users to view the profile registered by the user via the device 20. The user can access the medium via the device 20.

Figure 2:
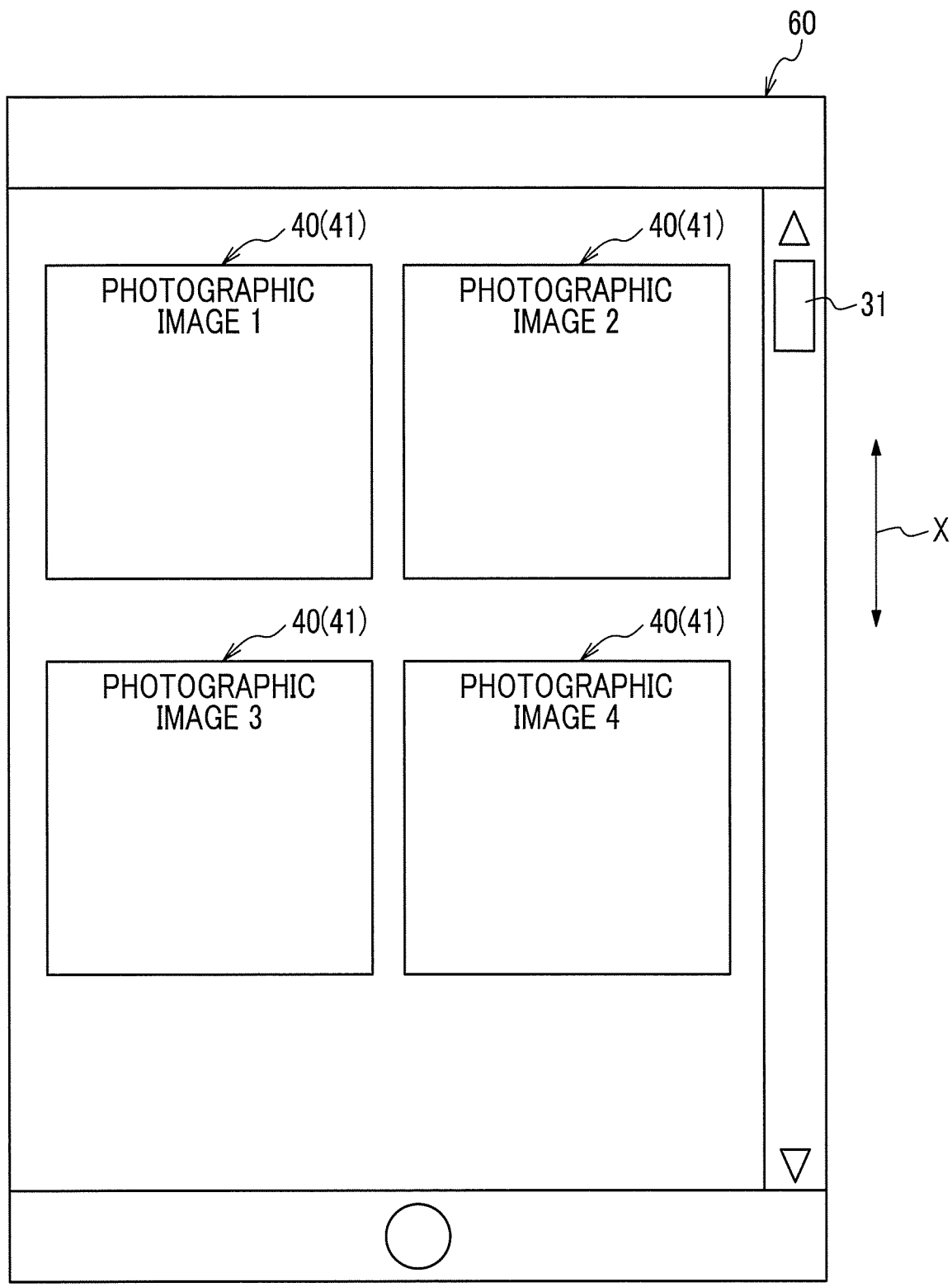
FIG. 2 is a diagram illustrating an example of a list screen according to the first exemplary embodiment.
Figure 3:
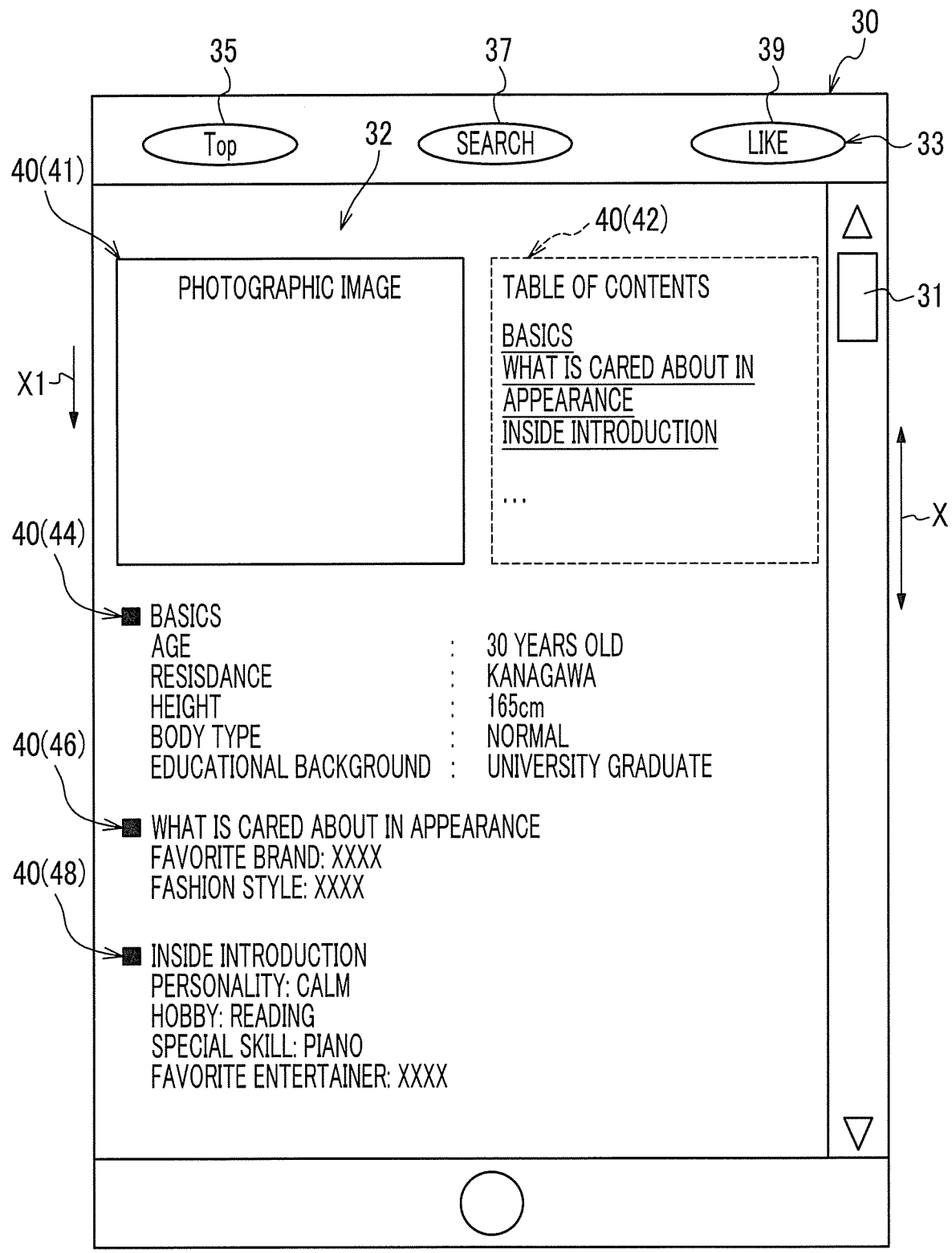
FIG. 3 is a diagram illustrating an example of a detailed screen according to the first exemplary embodiment.

Display screens displayed on the medium include, for example, a list screen 60 and a detailed screen 30. FIG. 2 illustrates an example of the list screen 60. FIG. 3 illustrates an example of the detailed screen 30.

As illustrated in FIG. 3, the detailed screen 30 is a display screen that displays the profile 32 of one user. The profile 32 has a plurality of items 40 indicating profile information. Specifically, the profile 32 has, as a plurality of items 40, items such as, for example, a photographic image 41, a table of contents 42, a basics 44, what is cared about in appearance 46, and an inside introduction 48. Note that the profile 32 is not limited to the profile shown in FIG. 3, and a description using self-expression such as a life log and a blog may be used.

The photographic image 41 is an item 40 indicating image information on a facial photograph or the like of a user who registers the profile 32 (hereinafter sometimes referred to as a registered user).

The table of contents 42 is a headline indicating each item 40. In the table of contents 42, the display order of the headline indicating each item 40 corresponds to the display order of the item 40. That is, the items 40 of the basics 44, what is cared about in appearance 46, and the inside introduction 48 are arranged in order from the top on the detailed screen 30, whereas the headlines of the basics 44, what is cared about in appearance 46, and the inside introduction 48 are arranged in order from the top on the table of contents 42. Then, for example, in a case where the viewer selects one of the headlines shown in the table of contents 42, the item 40 corresponding to the headline is displayed.

The basics 44 is an item 40 indicating basic profile information of the registered user. The basics 44 further includes, for example, items 40 such as age, residence, height, body type, and educational background.

What is cared about in appearance 46 is an item 40 indicating that the registered user cares about the appearance. What is cared about in appearance 46 further includes items 40 such as favorite brands and fashion styles, as an example.

The inside introduction 48 is an item 40 for introducing the inside of the registered user. The inside introduction 48 further includes items 40 such as personality, hobbies, special skills, and favorite entertainers.

In addition to the profile 32, the detailed screen 30 has a display portion 33 on which a Top button 35, a search button 37, a like button 39, and the like are displayed. The search button 37 is, for example, an operation button for shifting to a search screen for searching registered users with a search condition such as a keyword. The Top button 35 is, for example, an operation button for shifting to the list screen 60. The like button 39 is an operation button for performing an operation indicating an intention to like the profile 32 being displayed.

Further, the detailed screen 30 has, for example, a scroll bar 31 as an operation unit for performing a scroll operation of sliding the display in the arrow X direction. By performing the scroll operation using the scroll bar 31 on the detailed screen 30, it is possible to display items 40 that do not fit on the display screen.

On the other hand, as illustrated in FIG. 2, the list screen 60 is a display screen for displaying a part of profile information of the profile 32 for a plurality of users. Specifically, the list screen 60 displays a list of photographic images 41 of a plurality of users. Then, for example, in a case where the viewer selects one of the photographic images 41 shown on the list screen 60, the detailed screen 30 of the selected user is displayed. The list screen 60 also has a scroll bar 31 like the detailed screen 30.

The display screen displayed on the medium may not have the list screen 60 but may have only the detailed screen 30.

Figure 4:
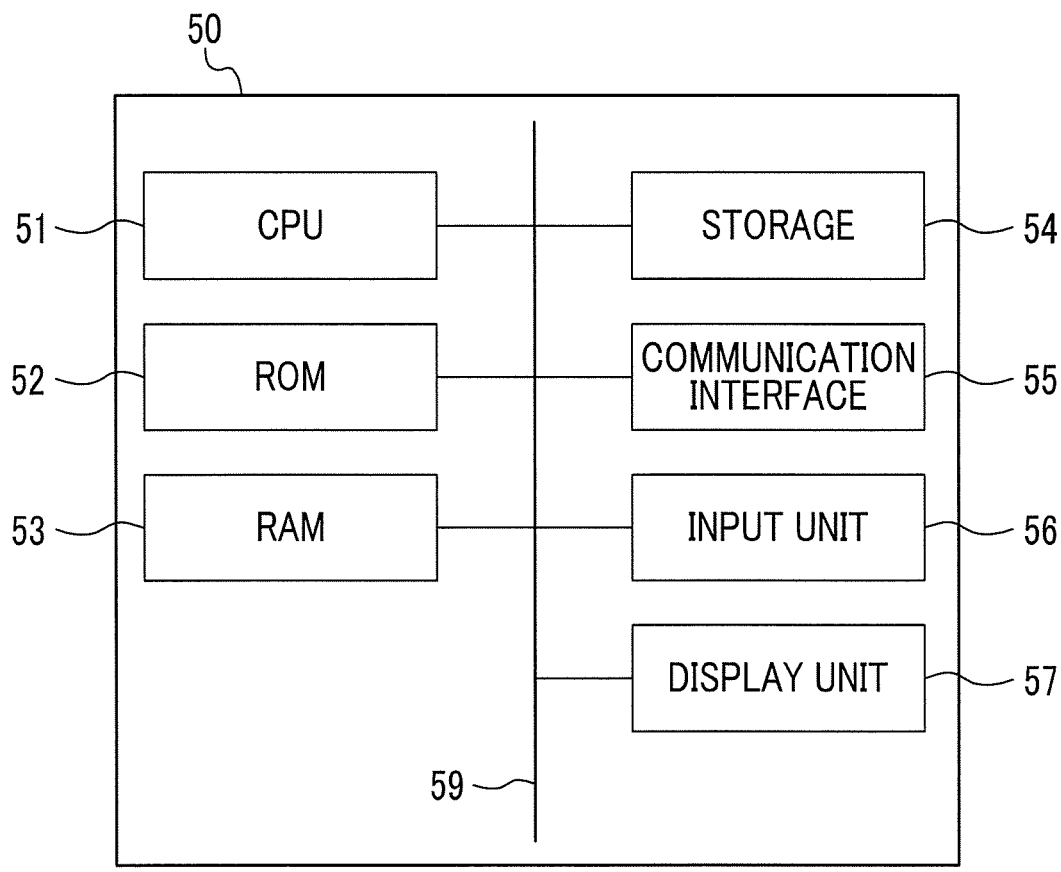
FIG. 4 is a block diagram illustrating an example of a hardware configuration of a server device according to the first exemplary embodiment.

FIG. 4 is a block diagram illustrating the hardware configuration of the server device 50. The server device 50 has a function as a computer, and as illustrated in FIG. 4, includes a central processing unit (CPU) 51, a read only memory (ROM) 52, a random access memory (RAM) 53, a storage 54, a communication interface 55, an input unit 56, and a display unit 57. The respective units of the server device 50 are communicably connected to each other through a bus 59.

The CPU 51 is a central processing unit and executes various programs including a display control program and controls each unit. That is, the CPU 51 reads a program from the ROM 52 or the storage 54, and executes the program using the RAM 53 as a work area.

The ROM 52 stores various programs and various data. The RAM 53 temporarily stores a program or data as a work area. The storage 54 is configured by a storage unit such as a hard disk drive (HDD) or a solid state drive (SSD), and stores various programs including an operating system and various data.

The communication interface 55 is an interface for communicating with other devices such as the device 20. The input unit 56 includes, for example, a pointing device such as a mouse and a keyboard, and is used to perform various inputs. The display unit 57 is, for example, a liquid crystal display, and displays various types of information. A touch panel type display may be adopted as the display unit 57. In this case, the display may function as the input unit 56.

Figure 5:
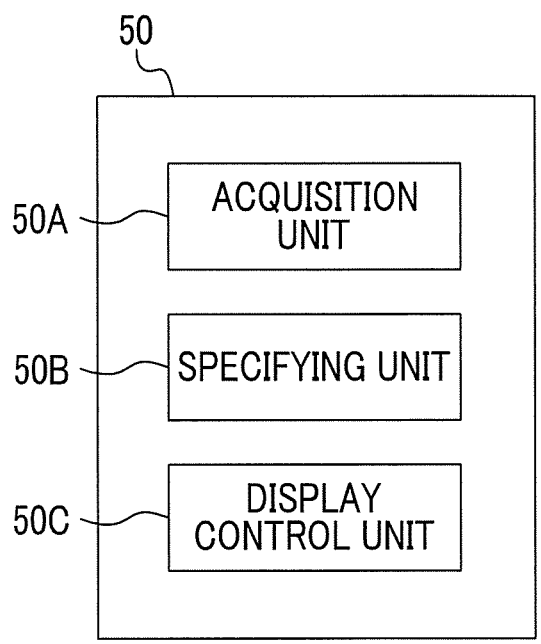
FIG. 5 is a block diagram illustrating an example of a functional configuration of the server device according to the first exemplary embodiment.

In a case of executing the above program, the server device 50 implements various functions by using the above hardware resources. The functional configuration implemented by the server device 50 will be described. FIG. 5 is a block diagram illustrating an example of the functional configuration of the server device 50.

As illustrated in FIG. 5, the server device 50 has an acquisition unit 50A, a specifying unit 50B, and a display control unit 50C, as functional configurations. Each functional configuration is realized by the CPU 51 reading and executing the display control program stored in the ROM 52 or the storage 54.

The acquisition unit 50A acquires information on the operation history of a viewer who views profile information of a registered user (hereinafter, referred to as a first registered user) who uses the providing service. Specifically, the operation history includes a history of operations of indicating a desire. More specifically, in the present exemplary embodiment, the operation history is a history of operating the like button 39. That is, the operation history is a history of operations of pressing the like button 39. It should be noted that the viewer can be said to be a user who views profile information.

Further, the operation history includes a history of the display operation for displaying the item 40 of the profile information. Specifically, the history of the selection operation for selecting the item 40 of the profile information, that is, the operation history of the selection operation for the headline shown in the table of contents 42 corresponds to the history of the display operation. Further, the history of display operations includes a history of scroll operations performed by using the scroll bar 31. The first registered user is an example of the first user.

Figure 6:
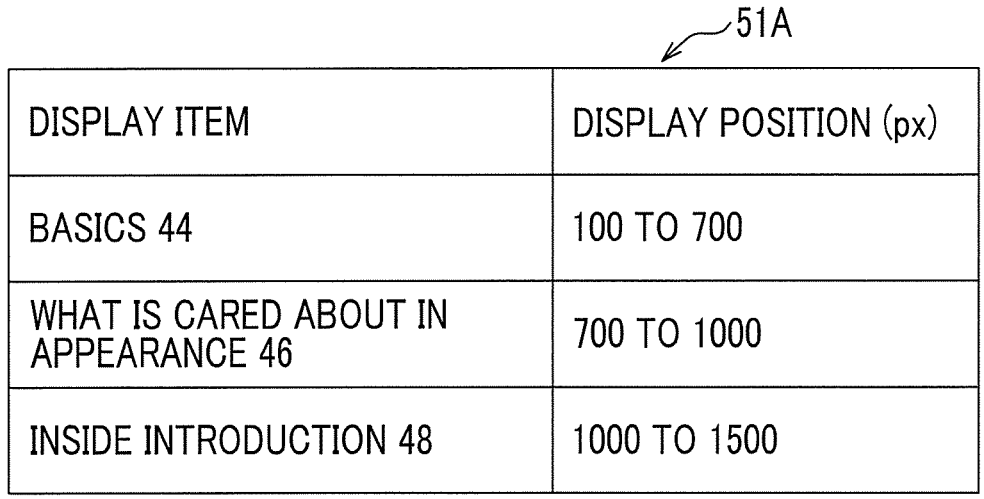
FIG. 6 is a diagram illustrating an example of table information illustrating a positional relationship between each item of a profile and a display position according to the first exemplary embodiment.

As a result of the scroll operation, the acquisition unit 50A acquires information on the item 40 displayed on the detailed screen 30 among the plurality of items 40, and the display range of the item 40. Here, the positional relationship between each item 40 and the display position is stored in the storage 54 as table information 51A (see FIG. 6). In the present exemplary embodiment, for example, with the X1 direction end in the photographic image 41 as a reference, the table information 51A shown in FIG. 6 has information on the display position (display range) of each item 40 in the X1 direction from the reference. Further, the table information 51A is updated according to the scroll operation. The acquisition unit 50A refers to the table information 51A and acquires information on the item 40 displayed on the display screen and the display range of the item 40.

The specifying unit 50B specifies an emphasis item that the viewer desires to emphasize out of the profile information, from the viewer's operation history acquired by the acquisition unit 50A. Specifically, in the present exemplary embodiment, the specifying unit 50B specifies, as an emphasis item, the item 40 displayed when the like button 39 is operated, among the profile information. In addition, it can be said that the emphasis items are, in other words, items that the viewer is interested in or items that the viewer is paying attention to. Here, the like button may be displayed in association with each of the items of the profile information or with each photo, and in that case, the item which is associated with the pressed like button may be specified as an emphasis item.

Further, the specifying unit 50B specifies the item first selected by the viewer, in the selection operation for the headline shown in the table of contents 42, as an emphasis item. Specifically, in the present exemplary embodiment, in a case where the selection operation for the headline shown in the table of contents 42 has been first performed on the displayed detailed screen 30, in the selection operation for the headline shown in the table of contents 42, the item selected first by the viewer is specified as an emphasis item.

Figure 7:
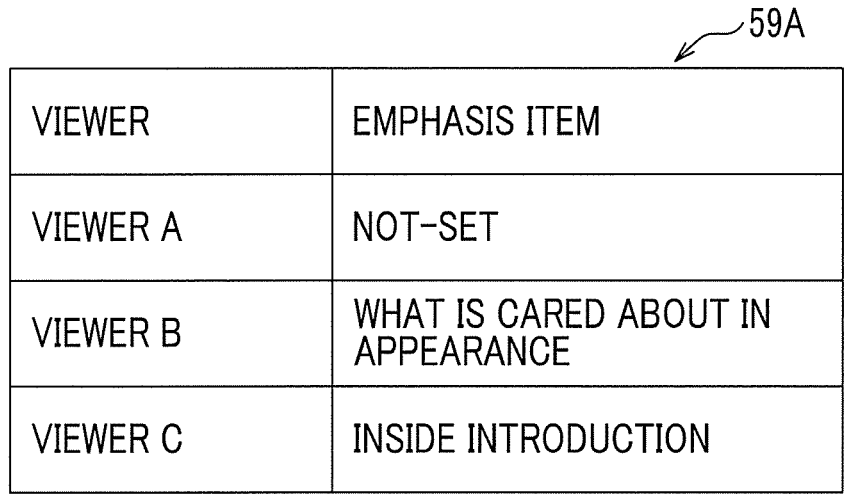
FIG. 7 is a diagram illustrating an example of a database in which information on emphasis items specified by the server device according to the first exemplary embodiment is set in association with each viewer.

Further, as illustrated in FIG. 7, the specifying unit 50B stores the information on the specified emphasis items in the storage 54 as a database 59A in association with each viewer. That is, the specifying unit 50B sets the specified emphasis items in association with each viewer.

In a case where a viewer views profile information on a second registered user different from the first registered user, the display control unit 50C performs a display control (hereinafter referred to as priority display control) in which emphasis items are displayed with priority over other items. Specifically, in a case where the viewer views profile information of a plurality of registered users (more specifically, all registered users) including the first registered user and the second registered user, the display control unit 50C performs priority display control.

Specifically, the priority display control by the display control unit 50C is performed as follows. That is, the display control unit 50C changes the display mode of the detailed screen 30 from the basic display, which is the display mode shown in FIG. 3, to the priority display (see FIGS. 8 and 9).

The priority display is a display mode of displaying an emphasis item that the viewer viewing profile information desires to emphasize out of the profile information with priority over other items.

Figure 8:
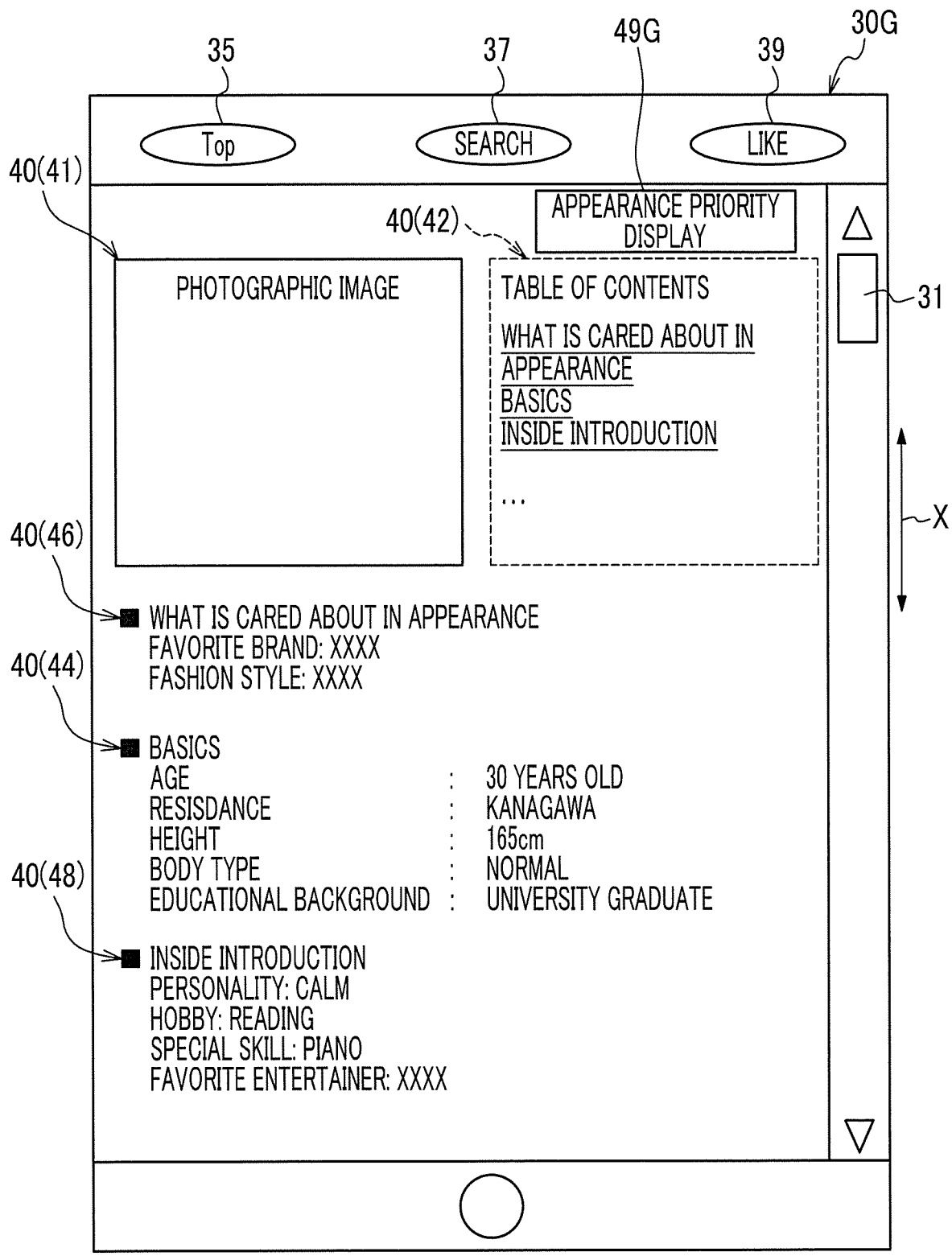
FIG. 8 is a diagram illustrating an example of an appearance priority screen according to the first exemplary embodiment.

The display mode shown in FIG. 8 is an example of a mode in which the "what is cared about in appearance 46" is displayed with priority as the item 40 regarding appearance. On the detailed screen 30 (hereinafter referred to as the appearance priority screen 30G) shown in FIG. 8, what is cared about in appearance 46 among the plurality of items 40 is displayed at the top. At this time, the display order of the headlines shown in the table of contents 42 is also changed according to the change of the display order of the items 40.

Figure 9:
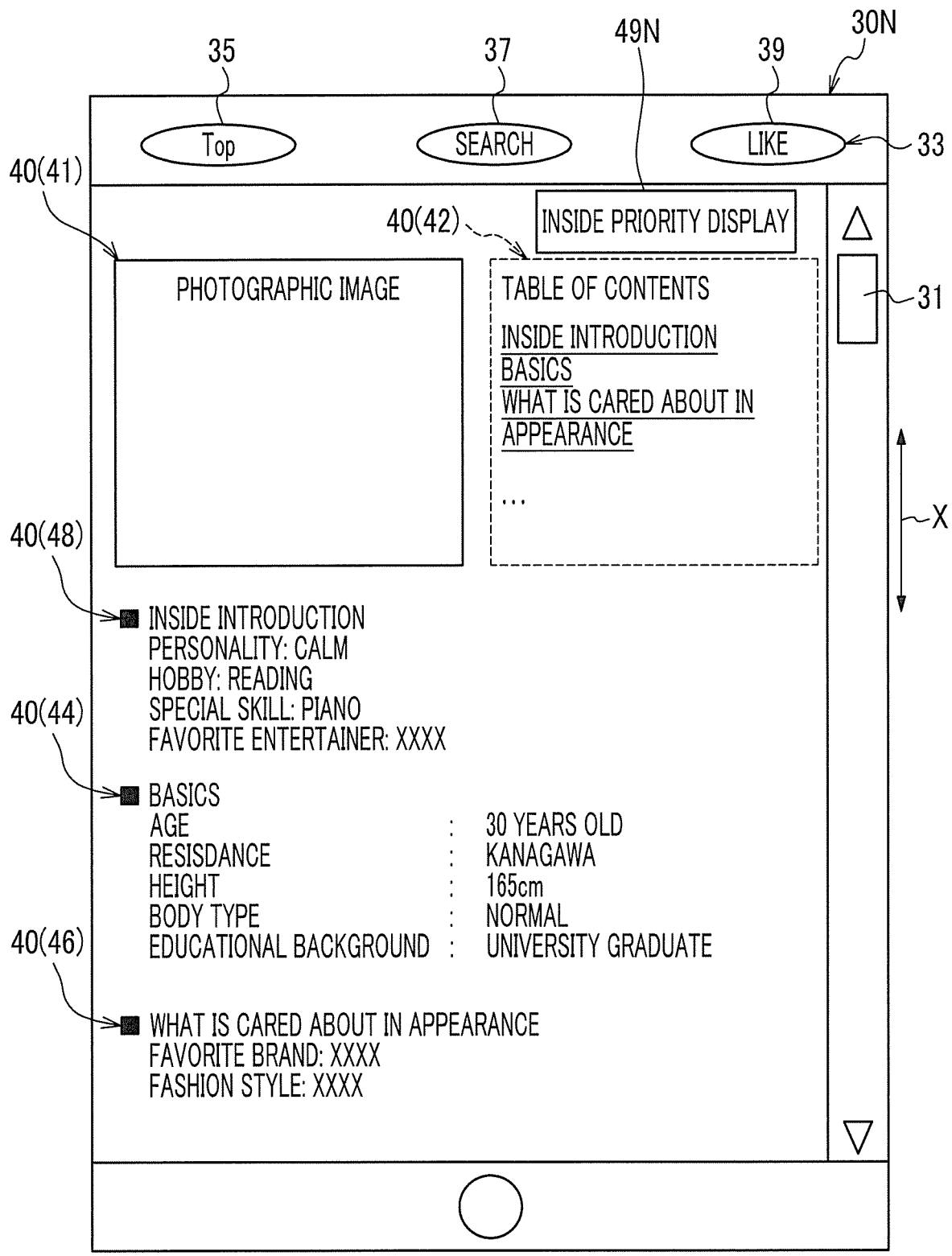
FIG. 9 is a diagram illustrating an example of an inside priority screen according to the first exemplary embodiment.

The display mode shown in FIG. 9 is an example of a mode in which "inside introduction 48" is preferentially displayed as the item 40 regarding the inside. On the detailed screen 30 (hereinafter referred to as the inside priority screen 30N) shown in FIG. 9, the inside introduction 48 among the plurality of items 40 is displayed at the top. At this time, the display order of the headlines shown in the table of contents 42 is also changed according to the change of the display order of the items 40.

The display mode of the priority display may be a highlight in which the color or the thickness of the texts indicating the profile information of the emphasis item is changed or the background color and the text color of the emphasis item are inverted. In addition, a plurality of highlights and a plurality of display order changes may be combined and used. The item 40 having a low priority may be displayed outside the display screen, that is, in a region that can be displayed for the first time by a display operation such as a scroll operation and a switching operation.

Further, the display control unit 500 further performs a control to display information indicating the item specified as the emphasis item. Specifically, the display control unit 50C performs a display 49G such as "appearance priority display", as information indicating the item specified as the emphasis item, on the appearance priority screen 30G shown in FIG. 8.

Further, the display control unit 50C performs a display 49N such as "inside priority display" as information indicating the item specified as the emphasis item, on the inside priority screen 30N shown in FIG. 9. In other words, the priority display can be said to be information indicating that emphasis items are displayed with priority.

Operation according to the Present Exemplary Embodiment

Figure 10:
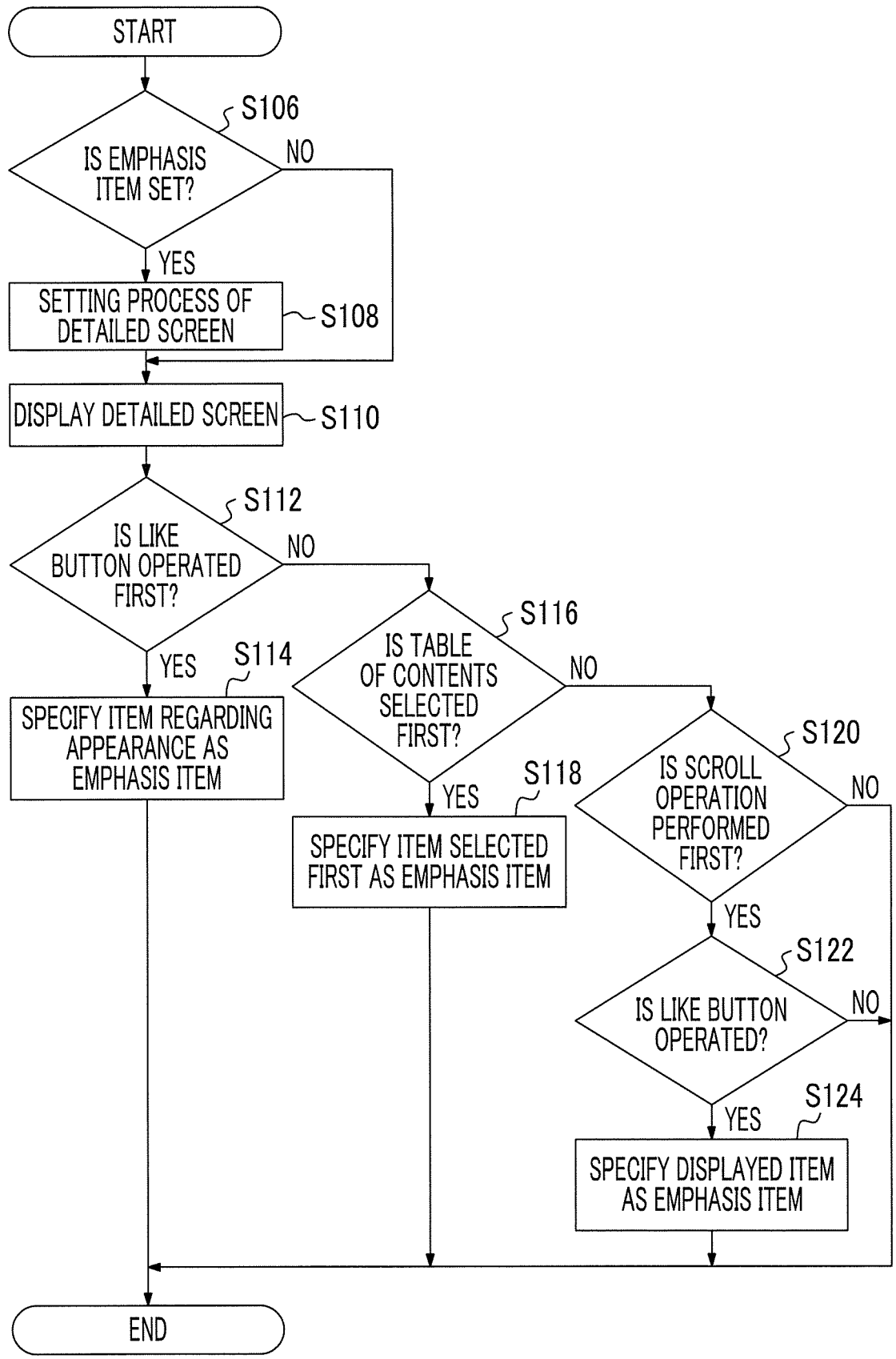
FIG. 10 is a flowchart illustrating an example of a flow of a display control process executed by the server device according to the first exemplary embodiment.

Next, an example of the operation of the present exemplary embodiment will be described. FIG. 10 is a flowchart illustrating the flow of the display control process executed by the server device 50.

The present process is performed by the CPU 51 reading the display control program from the ROM 52 or the storage 54 and executing the read program. The present process is started to be executed, for example, in a case where the viewer performs an operation to display the detailed screen 30 (see FIG. 3). Specifically, for example, the execution is started in a case where the viewer selects any one of the photographic images 41 on the list screen 60 (see FIG. 2).

As illustrated in FIG. 10, first, the CPU 51 refers to the database 59A (see FIG. 7) and determines whether or not an emphasis item associated with the viewer is set (step S106).

In a case where the CPU 51 determines that the emphasis item is set (step S106: YES), the CPU 51 executes the setting process of the display mode of the detailed screen 30 (step S108), and proceeds to step S110. Specifically, in step S108, in a case where the CPU 51 determines that the emphasis item is set, the CPU 51 creates information indicating a display mode in which the emphasis item is displayed with priority. For example, in a case where "what is cared about in appearance 46" is set as the emphasis item, information indicating a display mode (refer to the appearance priority screen 30G) in which the emphasis item is displayed with priority is created. In a case where "inside introduction 48" is set as the emphasis item, information indicating a display mode (refer to the inside priority screen 30N) in which the emphasis item is displayed with priority is created. With respect to the detailed screen 30, for example, the detailed screen 30 shown in FIG. 3 is the default screen.

On the other hand, in a case where it is determined that the emphasis item is not set (step S106: NO), the process proceeds to step S110 without passing through step S108.

In step S110, the CPU 51 performs control such that the detailed screen 30 corresponding to the display mode set in step S108 is displayed on the display unit of the device 20 that is the access source. Specifically, in step S108, in a case where the display mode that displays with priority "what is cared about in appearance 46" is set, the CPU 51 performs control such that the appearance priority screen 30G is displayed as the detailed screen 30. However, in a case where the display mode in which the "inside introduction 48" is displayed with priority is set, the CPU 51 performs control such that the inside priority screen 30N is controlled to be displayed as the detailed screen 30. In addition, in a case where the process does not go through step S108, the CPU 51 performs control such that the detailed screen 30 of FIG. 3, which is the default screen, is displayed.

Next, the CPU 51 determines whether or not the operation on the like button 39 has been performed first, on the displayed detailed screen 30 (step S112). That is, in step S112, the CPU 51 determines whether or not the pressing operation on the like button 39 has been performed first.

In a case of determining that the operation on the like button 39 has been performed first (step S112: YES), the CPU 51 specifies the item regarding appearance as an emphasis item (step S114), and ends the present process. Specifically, in step S114, the CPU 51 specifies "what is cared about in appearance 46" as an emphasis item. Note that the CPU 51 stores the information on the specified emphasis items as a database 59A in association with each viewer (the same applies to steps S118 and S124 below).

On the other hand, in a case where it is determined that the operation on the like button 39 has not been performed first (step S112: NO), the CPU 51 determines whether or not the selection operation for the headline shown in the table of contents 42 has been performed first on the displayed detailed screen 30 (step S116).

In a case of determining that the selection operation for the headline shown in the table of contents 42 is performed first (step S116: YES), the CPU 51 specifies the item first selected in the table of contents 42 as the emphasis item (step S118), and ends the present process.

On the other hand, in a case where it is determined that the selection operation for the headline shown in the table of contents 42 has not been performed first (step S116: NO), the CPU 51 determines whether or not the scroll operation has been performed first on the displayed detailed screen 30 (step S120).

In a case of determining that the scroll operation has been performed first (step S120: YES), the CPU 51 proceeds to step S122. On the other hand, in a case of determining that the scroll operation has not been performed first (step S120: NO), the CPU 51 ends the present process without specifying the emphasis item.

In step S122, it is determined whether or not the operation on the like button 39 has been performed, on the detailed screen 30 (step S122).

In a case of determining that the operation on the like button 39 has been performed (step S122: YES), the CPU 51 specifies the item displayed on the screen as an emphasis item (step S124), and ends the present process.

Specifically, as a result of the scroll operation, for example, in a case where "inside introduction 48" is displayed on the screen, the CPU 51 specifies "inside introduction 48" as the emphasis item of the viewer in step S124. In addition, as a result of the scroll operation, for example, in a case where "what is cared about in appearance 46" is displayed on the screen, the CPU 51 specifies "what is cared about in appearance 46" as the emphasis item of the viewer, in step S124. Note that the CPU 51 knows the item 40 displayed on the screen as a result of the scroll operation, based on the table information 51A illustrated in FIG. 6. Further, in a case where the plurality of items 40 are displayed on the screen, the CPU 51 specifies the item 40 having a large display range as an emphasis item in step S124, for example. Further, in a case where the display ranges are identical, the CPU 51 specifies, for example, the item 40 having a higher rank as an emphasis item based on a predetermined rank, in step S124.

In a case of determining that the operation on the like button 39 has not been performed (step S122: NO), the CPU 51 ends the present process without specifying the emphasis item.

Then, in a case where the present process is executed again, in step S110, the detailed screen 30 for displaying the emphasis items specified in the previous process with priority is displayed.

As described above, in the present exemplary embodiment, the CPU 51 specifies an emphasis item that the viewer desires to emphasize out of the profile information of a first registered user, from the viewer's operation history, and in a case where the viewer views the profile information of all registered users including the first registered user and a second registered user different from the first registered user, displays the emphasis item with priority over other items.

Therefore, it is possible to view an emphasis item efficiently in a case where the viewer views profile information of a second registered user, as compared with a configuration in which the emphasis item is displayed with priority over other items only in a case where the viewer views the profile information of a first registered user.

Further, in the present exemplary embodiment, since the emphasis item is specified by using the history of operating the like button 39, the operation history of the selection operation for the headline shown in the table of contents 42, and the history of the scroll operation, even in a case where the viewer does not perform an operation of designating an emphasis item, the emphasis item can be specified.

Further, in the present exemplary embodiment, when the operation on the like button 39 has been performed, the item displayed on the screen is specified as an emphasis item (see step S124), so that erroneous specification of emphasis items is suppressed, compared to the configuration in which items that are not displayed when the operation on the like button 39 has been performed are regarded as emphasis items. That is, it is possible to prevent the item that the viewer does not desire to emphasize, from being specified as an emphasis item.

Further, it is considered that the item that the viewer desires to emphasize in the table of contents 42 is selected first, but in the present exemplary embodiment, the item selected first in the table of contents 42 is specified as the emphasis item (see step S118), so that erroneous specification of emphasis items is suppressed, compared to the configuration in which the second and subsequent items selected from the plurality of items are regarded as emphasis items.

In the present exemplary embodiment, it is determined in steps S112, S116, and S120 whether or not various operations are the first operations after the detailed screen 30 is displayed, but the present invention is not limited to this, and at least one determination of step S112, S116, or S120 may be made. Even in this case, in a case where it is determined that none of the various operations has been performed first, for example, the emphasis item is not specified, and the present process ends.

Second Exemplary Embodiment

Figure 11:
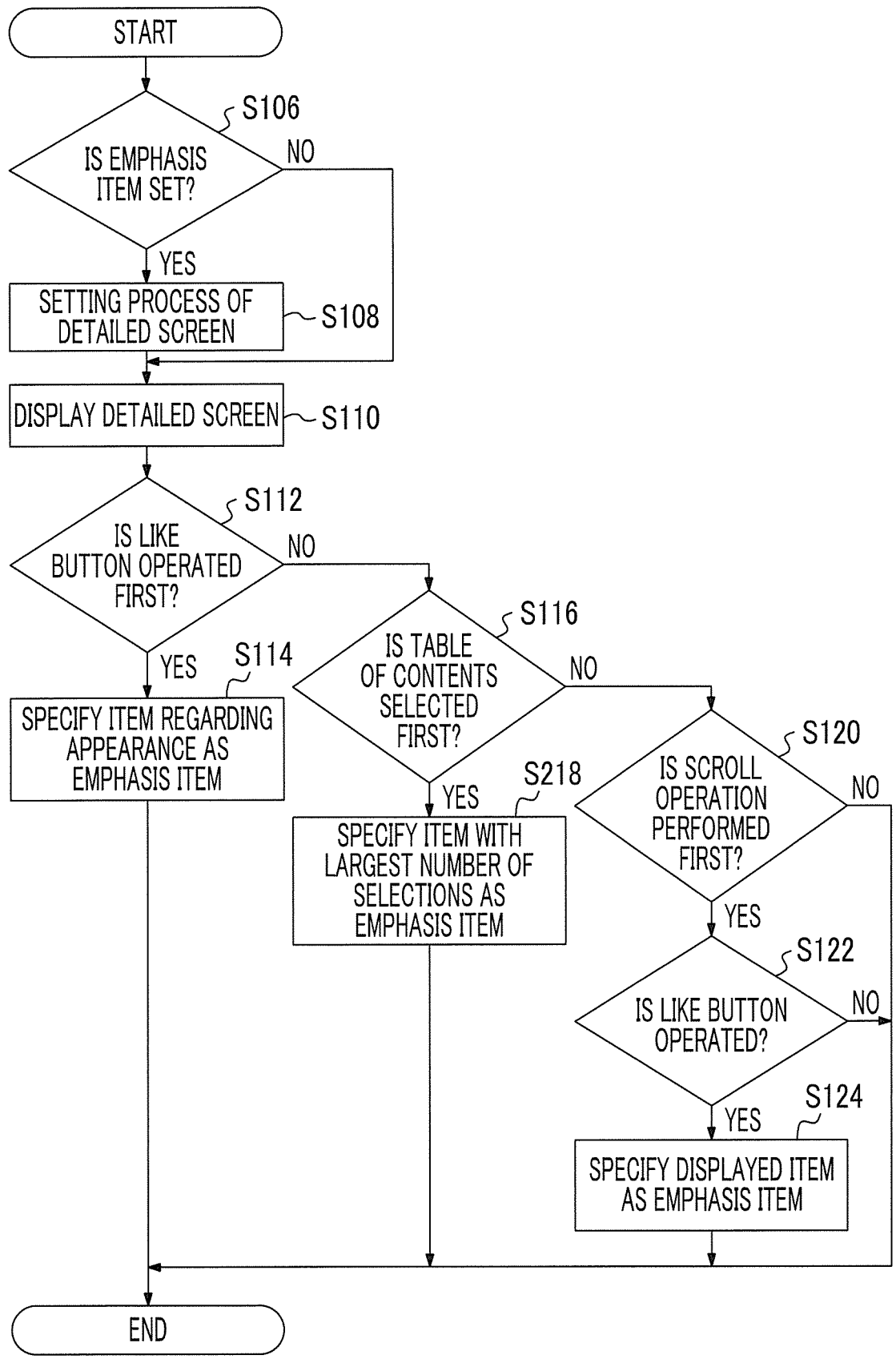
FIG. 11 is a flowchart illustrating an example of a flow of a display control process executed by a server device according to a second exemplary embodiment.

Next, a second exemplary embodiment will be described. FIG. 11 is a flowchart illustrating a part of the flow of the display control process executed by the server device 50 according to the second exemplary embodiment. The identical constituent elements as in the first exemplary embodiment are denoted by the identical reference numerals, and a description thereof will be appropriately omitted.

In the above-described first exemplary embodiment, the specifying unit 50B specifies the item first selected by the viewer as an emphasis item in the selection operation for the headline shown in the table of contents 42, but in the second exemplary embodiment, the specifying unit 50B specifies the item which is most frequently selected by the viewer is specified as the emphasis item, as an emphasis item, in the selection operation for the headline shown in the table of contents 42. Specifically, in the present exemplary embodiment, in a case where the selection operation for the headline shown in the table of contents 42 has been first performed on the displayed detailed screen 30, in the selection operation for the headline shown in the table of contents 42, the item which is most frequently selected by the viewer is specified as the emphasis item.

An example of the operation according to the second exemplary embodiment will be described below.

As illustrated in FIG. 11, in the present exemplary embodiment, in a case of determining that the selection operation for the headline shown in the table of contents 42 has been performed first (step S116: YES), the CPU 51 executes step S218 in place of step S118. In step S218, the CPU 51 specifies the item which is most frequently selected by the viewer as an emphasis item, in the selection operation for the headline shown in the table of contents 42, and ends the present process.

Further, in a case where there are a plurality of items that are most frequently selected by the viewer, the CPU 51 may specify, for example, the item that is selected first among the items that are most frequently selected by the viewer as an emphasis item.

It is considered that the number of selections of the item that the viewer desires to emphasize in the table of contents 42 will increase, but in the present exemplary embodiment, the item which is most frequently selected by the viewer in the table of contents 42 is specified as the emphasis item (see step S218), so that an erroneous specification of the emphasis item is suppressed, compared to the configuration in which an item having a smaller number of selections than other items is regarded as an emphasis item.

Third Exemplary Embodiment

Figure 12:
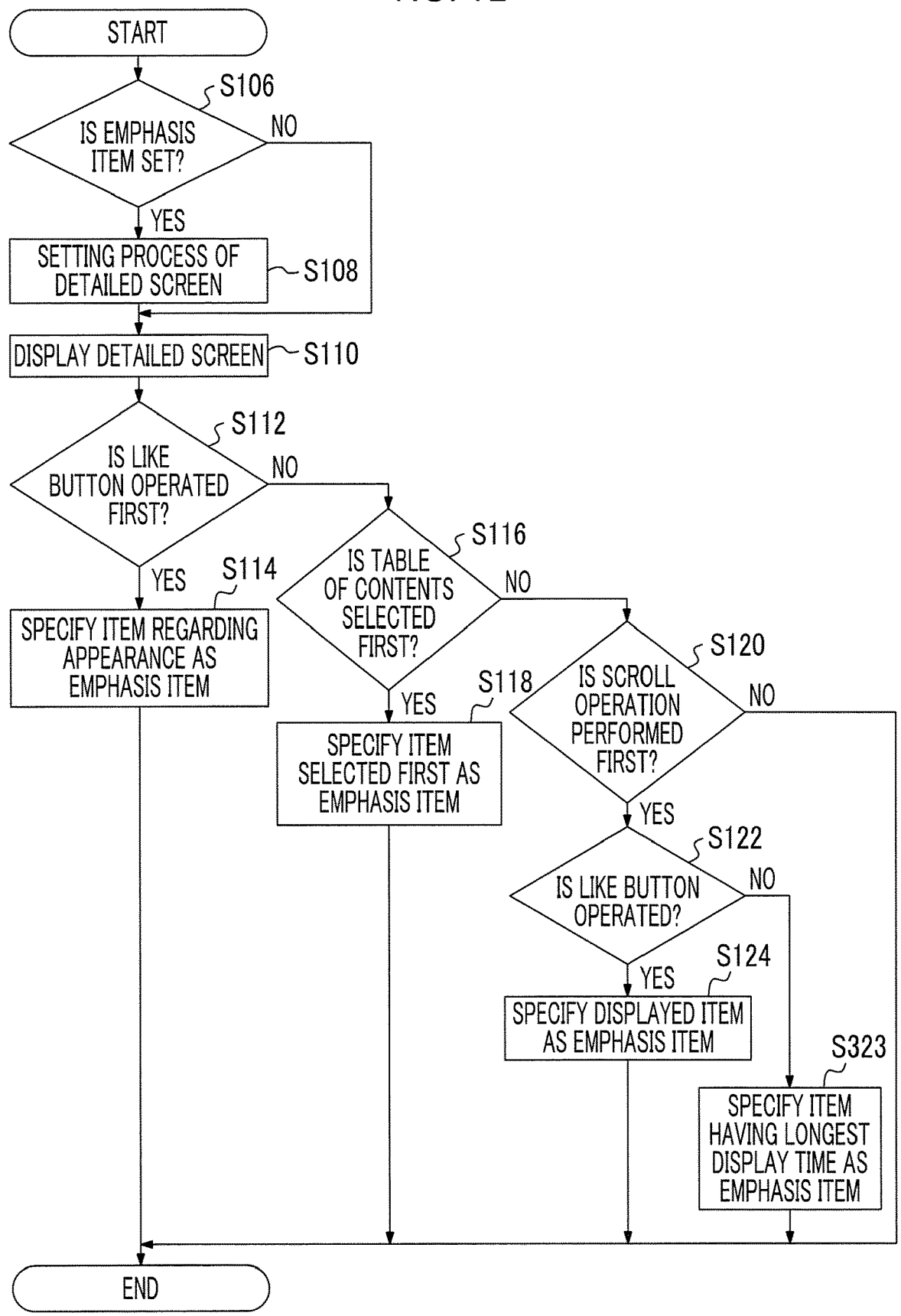
FIG. 12 is a flowchart illustrating an example of a flow of a display control process executed by a server device according to a third exemplary embodiment.

Next, a third exemplary embodiment will be described. FIG. 12 is a flowchart illustrating a part of the flow of the display control process executed by the server device 50 according to the third exemplary embodiment. The identical constituent elements as in the first exemplary embodiment are denoted by the identical reference numerals, and a description thereof will be appropriately omitted.

In the third exemplary embodiment, the specifying unit 50B further specifies the item having the longest display time displayed on the detailed screen 30 as the emphasis item.

An example of the operation according to the third exemplary embodiment will be described below.

As illustrated in FIG. 12, in the present exemplary embodiment, in a case where it is determined that the operation on the like button 39 has not been performed (step S122: NO), the CPU 51 specifies the item having the longest display time displayed on the detailed screen 30 as the emphasis item (step S323), and ends the present process. Note that the CPU 51 knows the item 40 displayed on the screen as a result of the scroll operation, based on the table information 51A illustrated in FIG. 6.

In a case where there are a plurality of items with the longest display time, the CPU 51 may specify, for example, the item selected first among the items having the longest display time as the emphasis item.

In the present exemplary embodiment, when the CPU 51 determines that the scroll operation is performed first (step S120: YES), the CPU 51 proceeds to step S122, but the present invention is not limited to this. For example, when the CPU 51 determines that the scroll operation is performed first (step S120: YES), the CPU 51 may execute step S323 instead of steps S122 and S124.

Fourth Exemplary Embodiment

Figure 13:
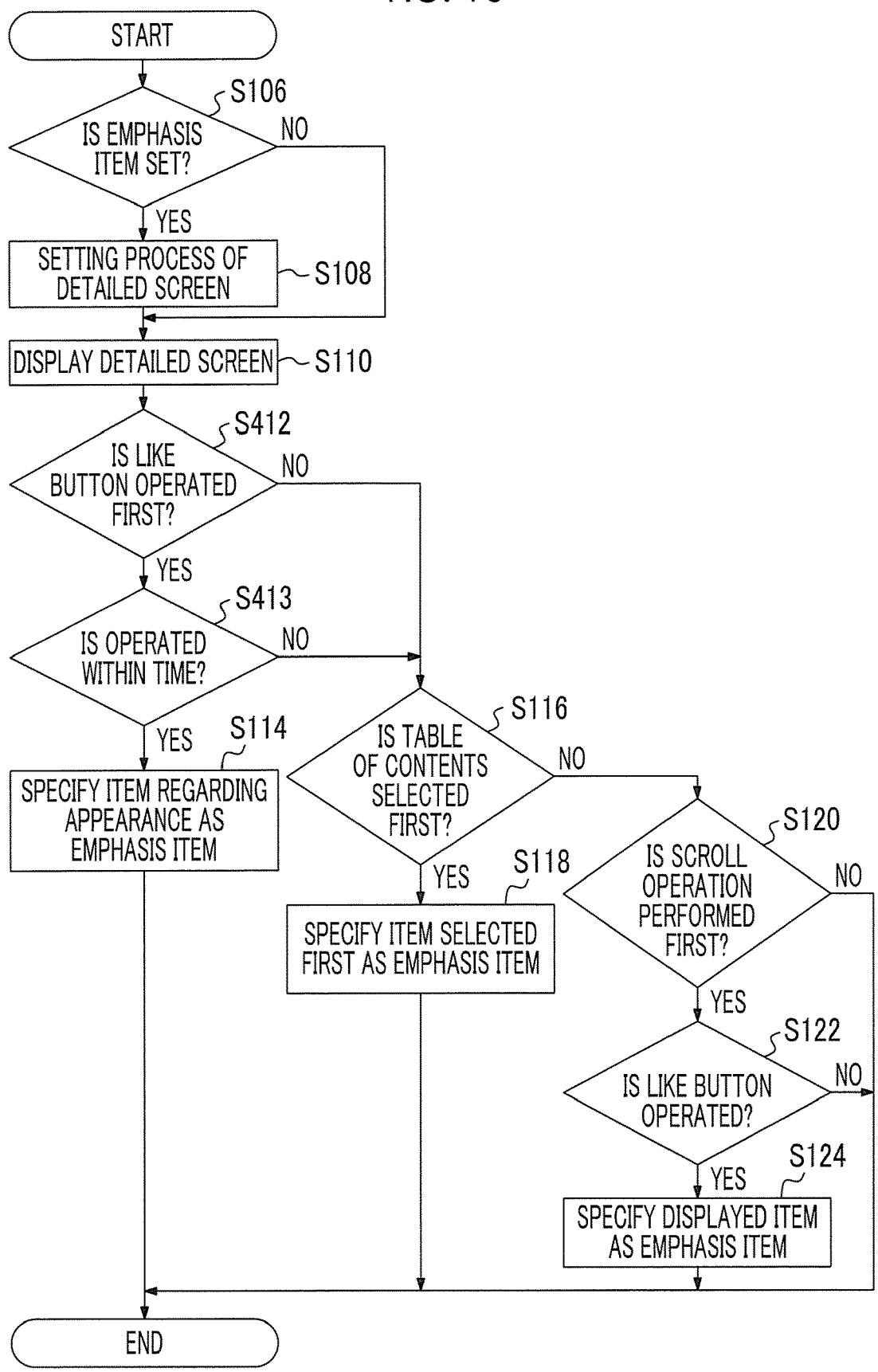
FIG. 13 is a flowchart illustrating an example of a flow of a display control process executed by a server device according to a fourth exemplary embodiment.

Next, a fourth exemplary embodiment will be described. FIG. 13 is a flowchart illustrating a part of the flow of the display control process executed by the server device 50 according to the fourth exemplary embodiment. The identical constituent elements as in the first exemplary embodiment are denoted by the identical reference numerals, and a description thereof will be appropriately omitted.

In the fourth exemplary embodiment, in a case where the operation is performed within a predetermined time, after any one item of the profile information is selected, the specifying unit 50B of the server device 50 specifies the selected item as the emphasis item.

An example of the operation according to the fourth exemplary embodiment will be described below.

As illustrated in FIG. 13, in the present exemplary embodiment, steps S412 and S413 are executed instead of step S112. Specifically, in step S412, the CPU 51 determines whether or not the operation on the like button 39 has been performed, on the displayed detailed screen 30. That is, in step S412, the CPU 51 determines whether or not the like button 39 has been pressed.

In a case of determining that the like button 39 has been operated (step S412: YES), the CPU 51 proceeds to step S413. On the other hand, in a case of determining that the like button 39 has not been operated (step S412: NO), the CPU 51 proceeds to step S116.

In step S413, the CPU 51 determines whether or not the operation time from the selection operation on the list screen to the operation of the like button 39 is within a predetermined time. The predetermined time is, for example, 3 seconds. The operation time from the display of the detailed screen 30 to the operation of the like button 39 may be measured.

In a case of determining that the operation time is within the predetermined time (step S413: YES), the CPU 51 specifies the item 40 regarding appearance as the emphasis item (step S122), and ends the present process. On the other hand, in a case of determining that the operation time exceeds the predetermined time (step S413: NO), the CPU 51 proceeds to step S116.

As described above, in the present exemplary embodiment, in a case where the operation is performed within a predetermined time, after any one item of the profile information is selected, the CPU 51 of the server device 50 specifies the selected item as the emphasis item.

In a case where the item selected by the viewer is an item that is desired to be emphasized, it is considered that the like button 39 is operated immediately after the selected item is displayed. However, in the present exemplary embodiment, an operation is performed within a predetermined time after one item of the profile information is selected, the selected item is specified as an emphasis item, so that an erroneous specification of the emphasis item is suppressed, compared to the configuration in which in a case where the operation of the like button 39 is performed after an item of the profile information is selected, the selected item is always regarded as the emphasis item.

Fifth Exemplary Embodiment

Figure 14:
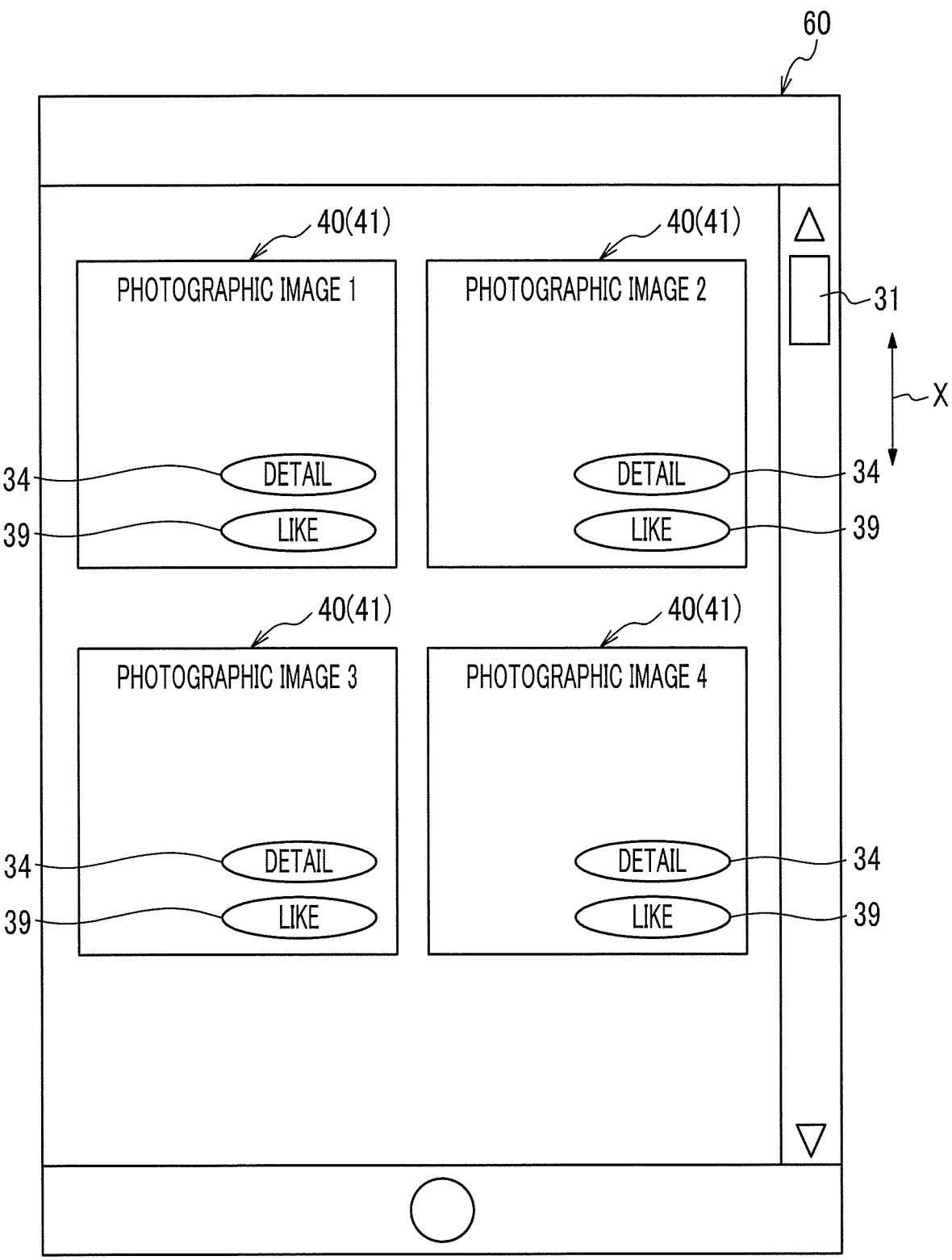
FIG. 14 is a diagram illustrating an example of a list screen according to a fifth exemplary embodiment.
Figure 15:
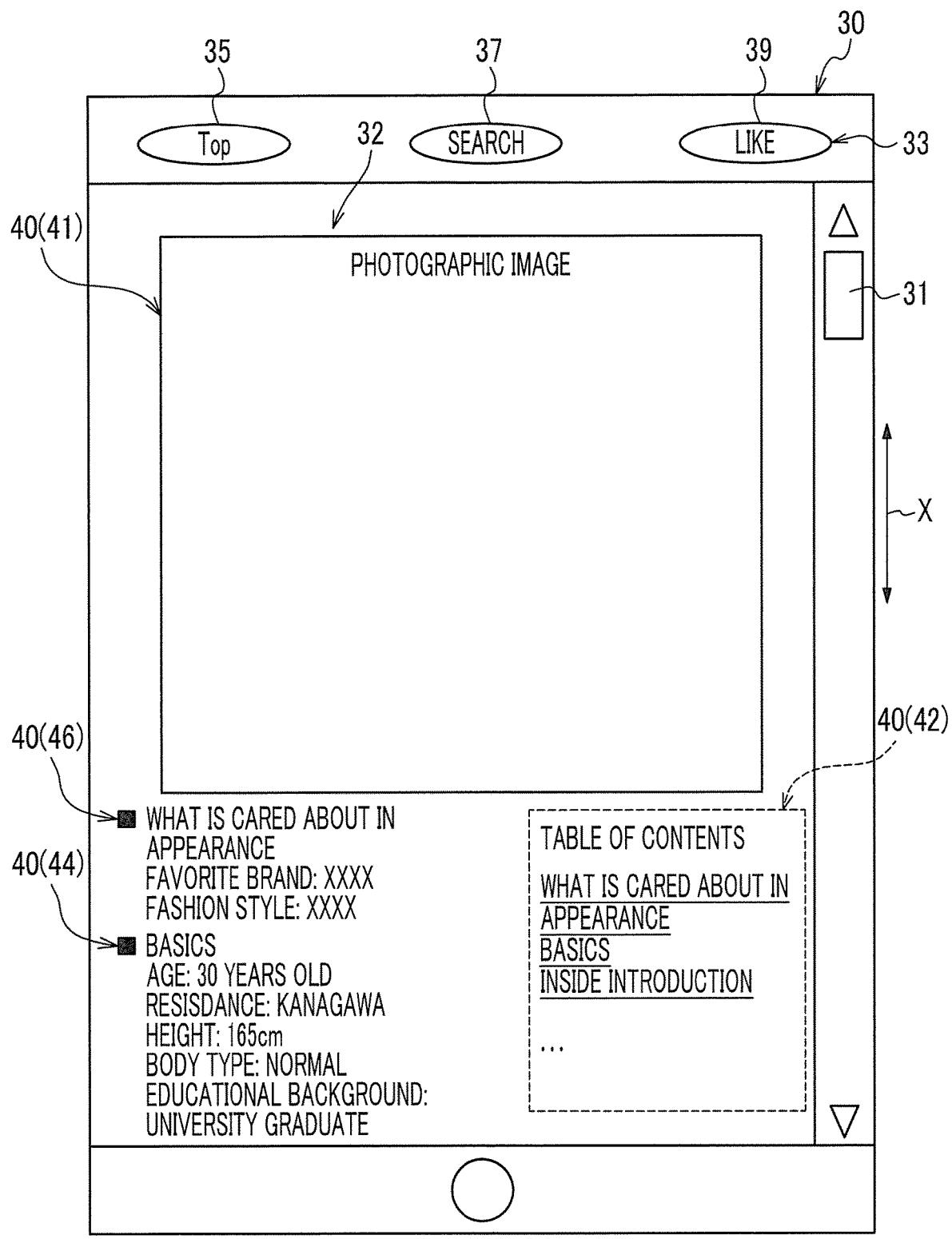
FIG. 15 is a diagram illustrating an example of an appearance priority screen according to the fifth exemplary embodiment.
Figure 16:
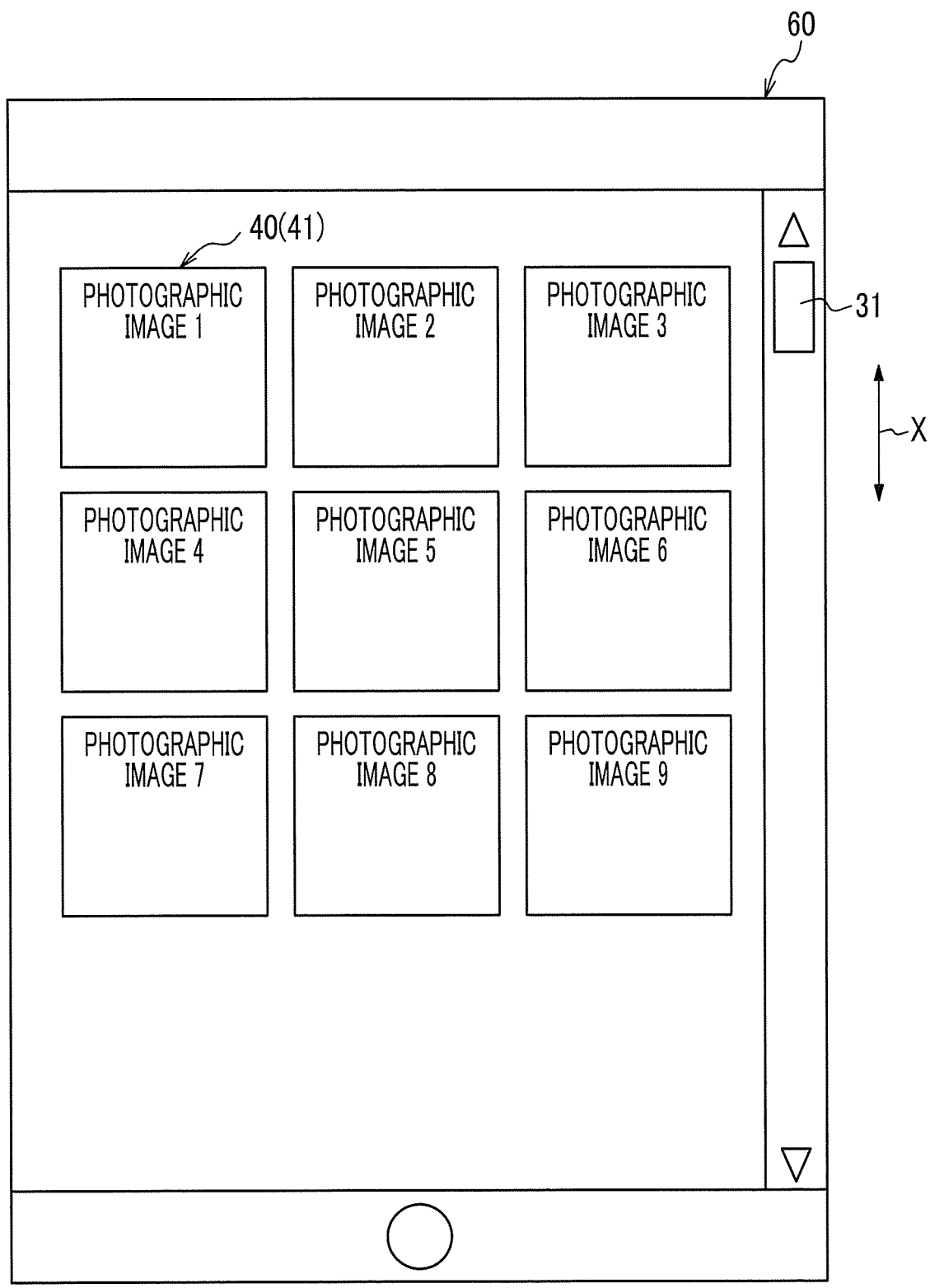
FIG. 16 is a diagram illustrating an example of a list screen in which the number of displayed photographic images is increased, according to the fifth exemplary embodiment.
Figure 17:
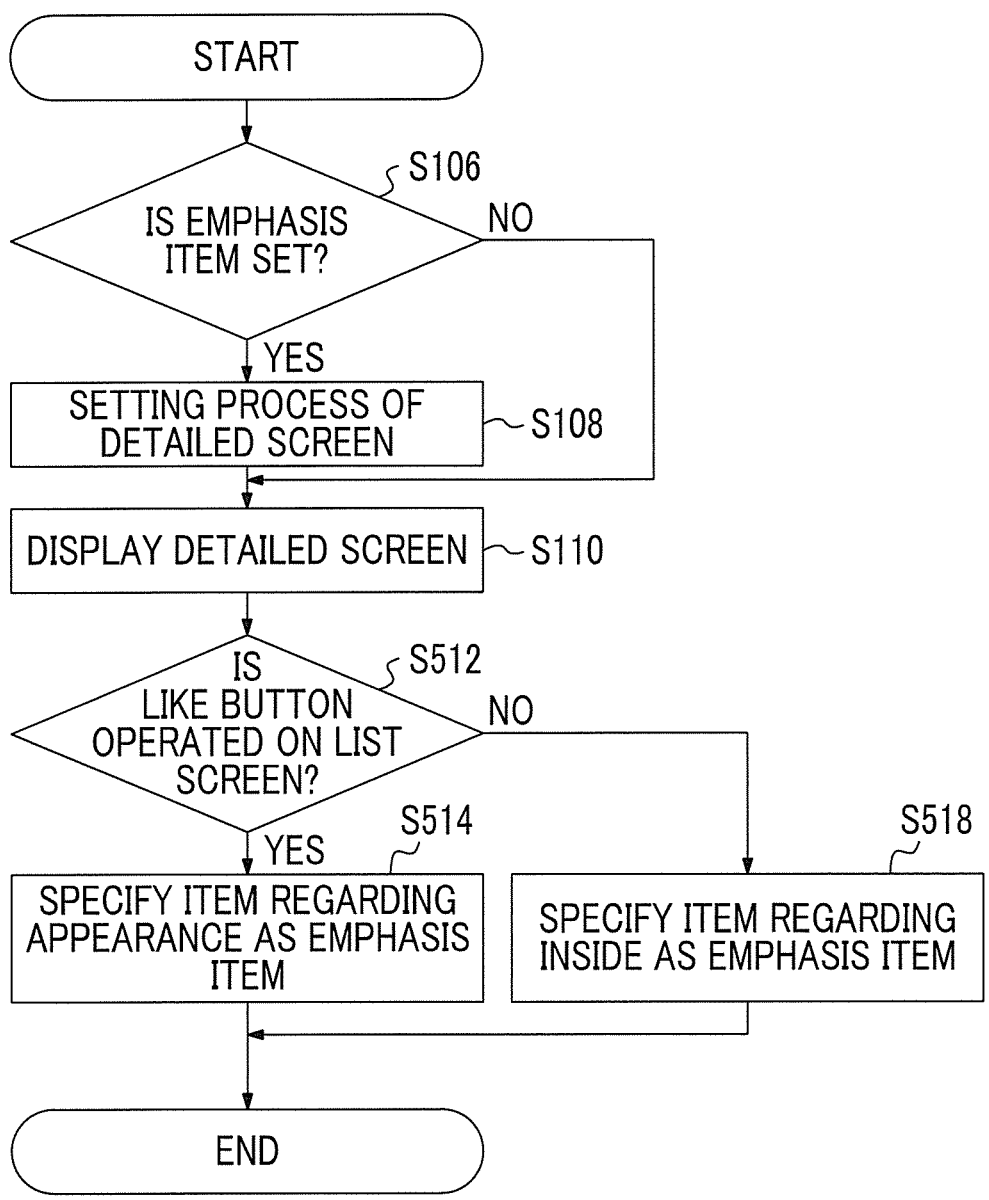
FIG. 17 is a flowchart illustrating an example of a partial flow of a display control process executed by a server device according to the fifth exemplary embodiment.
Figure 18:
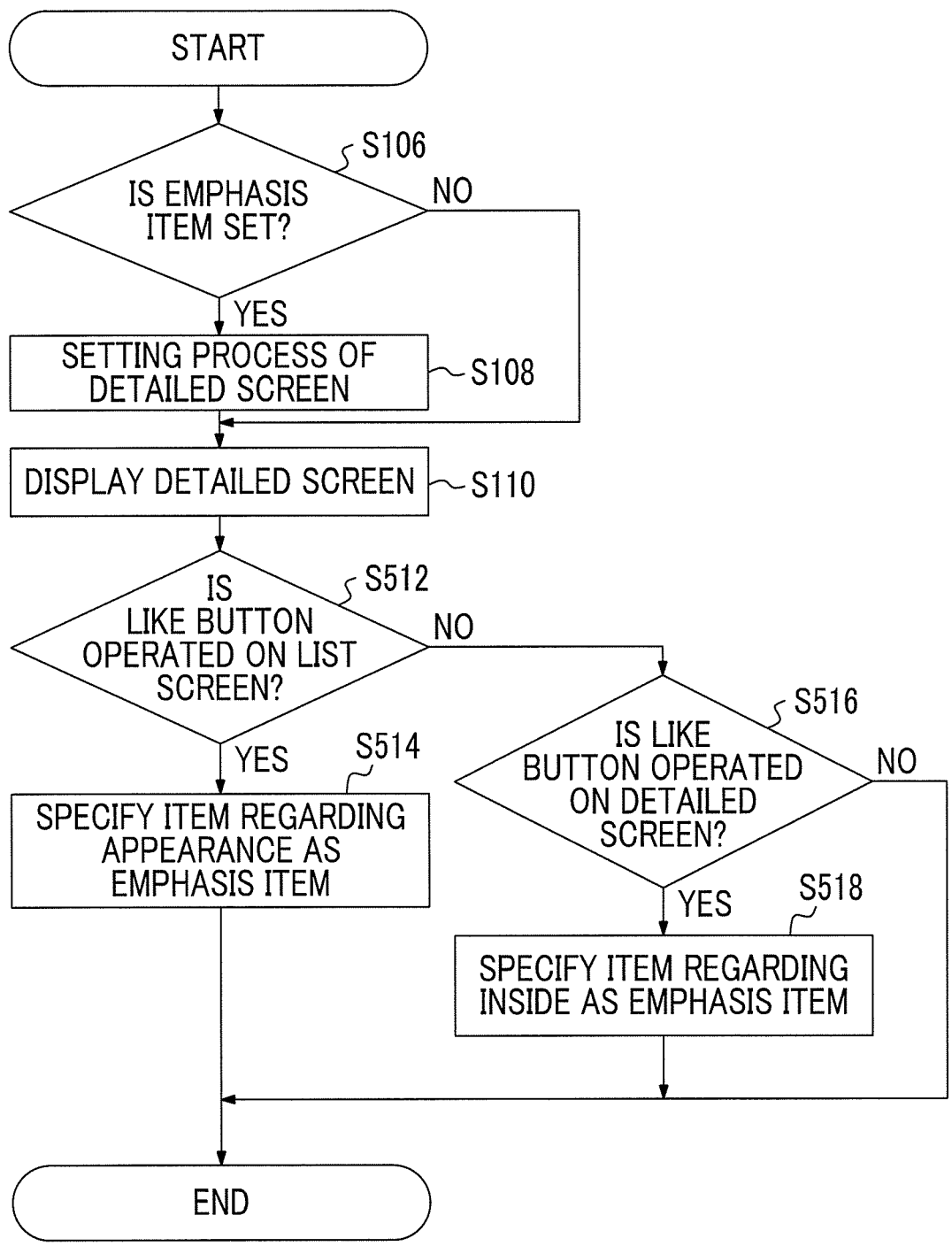
FIG. 18 is a modification example of the flowchart shown in FIG. 17.

Next, a fifth exemplary embodiment will be described. FIG. 14 is a diagram illustrating a list screen 60 according to the fifth exemplary embodiment. FIG. 15 is a diagram illustrating an appearance priority screen 30G according to the fifth exemplary embodiment. FIG. 16 is a diagram illustrating a list screen 60 in which the number of displayed photographic images 41 is increased according to the fifth exemplary embodiment. FIGS. 17 and 18 are flowcharts illustrating a part of the flow of the display control process executed by the server device 50 according to the fifth exemplary embodiment. The identical constituent elements as in the first exemplary embodiment are denoted by the identical reference numerals, and a description thereof will be appropriately omitted.

In the fifth exemplary embodiment, as illustrated in FIG. 14, on the list screen 60, a like button 39 and a detailed button 34 are attached to each of the plurality of photographic images 41. The like button 39 is an operation button for performing an operation of indicating an intention to like the photographic image 41 with the like button 39 is attached. The detailed button 34 is an operation button for selecting the user of the photographic image 41 to which the detailed button 34 is attached. Therefore, in a case where the detailed button 34 is operated, the detailed screen 30 of the user of the photographic image 41 to which the detailed button 34 is attached is displayed.

In the present exemplary embodiment, in a case where the like button 39 and some items of the profile information (for example, the photographic image 41) are displayed, and in a case where the like button 39 is operated, the specifying unit 50B of the server device 50 specifies the displayed items (for example, the photographic image 41) as the emphasis items. Specifically, the specifying unit 50B specifies the photographic image 41 as an emphasis item, in a case where the like button 39 is operated on the list screen 60 shown in FIG. 15.

Note that in the present exemplary embodiment, the specifying unit 50B specifies the item 40 regarding appearance, which includes the photographic image 41, as an emphasis item. The item 40 regarding appearance specifically includes, as the item 40, a photographic image 41 and what is cared about in appearance 46. The item 40 regarding appearance may include other items 40 indicating the appearance of the user (for example, the height and body type in the basics 44).

Further, in a case where the like button 39 and some items of the profile information (for example, the photographic image 41) are displayed, and in a case where the like button 39 is not operated, the specifying unit 50B specifies the items which are not displayed (for example, items related to the inside) as the emphasis items.

The item 40 regarding the inside specifically includes an inside introduction 48 as the item 40. The item 40 regarding the inside may include another item 40 indicating the inside of the user.

As described above, the emphasis item specified by the specifying unit 50B may include a plurality of items 40, and may be an item classified into an inside and an appearance, for example.

In the present exemplary embodiment, in a case where the emphasis item is the item 40 regarding appearance including the photographic image 41, the display control unit 500 performs priority display control by performing control of enlarging and displaying the photographic image 41. Specifically, as illustrated in FIG. 16, on the appearance priority screen 30G, the photographic image 41 is enlarged from the default size (see FIG. 3) and displayed.

In the present exemplary embodiment, the display control unit 50C may perform control to reduce and display the photographic image 41 in a case where the emphasis item is the item 40 regarding the inside.

Further, in the present exemplary embodiment, in a case where the emphasis item is the photographic image 41 (an example of an image), the display control unit 50C performs control to increase the number of sheets of the photographic image 41 to be displayed, on the list screen 60 that displays the photographic images 41 of a plurality of users. Specifically, as illustrated in FIG. 17, on the list screen 60, the number of displayed photographic images 41 is increased from the default number of displayed images (see FIG. 2).

The operation according to the fifth exemplary embodiment will be described below.

As illustrated in FIG. 17, in the present exemplary embodiment, in step S110, the CPU 51 displays the detailed screen 30 set in step S108. Next, the CPU 51 determines whether or not the like button 39 has been operated on the list screen 60 (step S512). That is, in step S512, the CPU 51 determines whether or not the depression operation on the like button 39 has been pressed on the list screen 60.

In a case of determining that the like button 39 has been operated on the list screen 60 (step S512: YES), the CPU 51 specifies the item 40 regarding appearance as an emphasis item (step S514), and ends the present process. On the other hand, in a case of determining that the like button 39 has not been operated on the list screen 60 (step S512: NO), the CPU 51 specifies the item 40 regarding the inside as an emphasis item (step S518), and ends the present process.

As illustrated in FIG. 18, in a case where it is determined that the like button 39 is not operated on the list screen 60 (step S512: NO), the CPU 51 may determine whether or not the operation on the like button 39 has been performed, on the detailed screen 30 (step S516).

In this case, for example, in a case of determining that the like button 39 has been operated on the detailed screen 30 (step S516: YES), the CPU 51 specifies the item 40 regarding the inside as an emphasis item (step S516), and ends the present process. On the other hand, in a case of determining that the like button 39 has not been operated on the detailed screen 30 (step S516: NO), the CPU 51 does not update the setting of the emphasis item and ends the present process.

Other Exemplary Embodiments

The specifying unit 50B may specify the emphasis item by the following method. The specifying unit 50B may specify the emphasis item, for example, based on the line of sight of the viewer who views the item 40 of the profile information displayed by the display operation of the viewer. Specifically, for example, based on the information obtained by capturing the face of the viewer with the camera provided in the device 20 and detecting which item 40 of the displayed profile information that the viewer is gazing, the specifying unit 50B may specify the emphasis item. Whether the viewer is gazing is detected by, for example, the viewing time, the number of times of viewing, and the size of the pupil (that is, the degree of opening of the pupil).

Further, with respect to the item 40 of the profile information, a control is performed to display an operation button for performing an operation of indicating an intention to like the item 40 or an operation button for performing an operation of indicating an intention to be interested in the item 40, and the specifying unit 50B may specify the emphasis item, based on the operation information on the operation button.

Further, in a case where the like button 39 has been operated, a control is performed to display a screen for selecting which item 40 has been emphasized (that is, an item which the user is interested in), and the specifying unit 50B may specify the selected item 40 as an emphasis item.

Further, the specifying unit 50B may specify as the emphasis item, the item 40 designated in advance as an emphasis item by the viewer. Specifically, for example, the specifying unit 50B, which perform a control for displaying a selection screen for selecting the item 40 (that is, the item 40 that the viewer is interested in) that the viewer emphasizes, before the display the detailed screen 30, specifies the selected item 40 as an emphasis item. Further, the present invention is not limited to the case where the item 40 is directly selected, and for example, the specifying unit 50B may specify the emphasis item, based on the selected display screen by performing a control to display a screen allowing the viewer to select one of the display screens such as the appearance priority screen 30G (see FIGS. 8 and 16) and the inside priority screen 30N (see FIG. 9) described above.

The present invention is not limited to the above exemplary embodiments, and various modifications, changes, and improvements can be made without departing from the spirit of the present invention. For example, the exemplary embodiments and the modifications described above may be appropriately combined and configured.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A display control device comprising:
a processor configured to
    specify an emphasis item that a viewer viewing profile information of a first user desires to emphasize out of the profile information, the first user using a service with which the profile information is registered, from an operation history of the viewer, and
    perform a display control of displaying the emphasis item with priority over other items, in a case where the viewer views profile information of a second user.

2. The display control device according to claim 1, wherein the operation history includes a history of operations of indicating a desire.

3. The display control device according to claim 2, wherein the processor is configured to specify an item displayed when the operation is performed, out of the profile information, as the emphasis item.

4. The display control device according to claim 2, wherein the processor is configured to, in a case where an operation button for performing the operation and some items of the profile information are displayed, specify an item that is not displayed as the emphasis item in a case where the operation button is not operated.

5. The display control device according to claim 3, wherein the processor is configured to, in a case where an operation button for performing the operation and some items of the profile information are displayed, specify an item that is not displayed as the emphasis item in a case where the operation button is not operated.

6. The display control device according to claim 2, wherein the processor is configured to specify a selected item as the emphasis item, after any one item of the profile information is selected, in a case where the operation is performed within a predetermined time.

7. The display control device according to claim 3, wherein the processor is configured to specify a selected item as the emphasis item, after any one item of the profile information is selected, in a case where the operation is performed within a predetermined time.

8. The display control device according to claim 4, wherein the processor is configured to specify a selected item as the emphasis item, after any one item of the profile information is selected, in a case where the operation is performed within a predetermined time.

9. The display control device according to claim 5, wherein the processor is configured to specify a selected item as the emphasis item, after any one item of the profile information is selected, in a case where the operation is performed within a predetermined time.

10. The display control device according to claim 1, wherein the operation history includes a history of a selection operation of selecting an item of the profile information.

11. The display control device according to claim 2, wherein the operation history includes a history of a selection operation of selecting an item of the profile information.

12. The display control device according to claim 3, wherein the operation history includes a history of a selection operation of selecting an item of the profile information.

13. The display control device according to claim 10, wherein the processor is configured to specify an item which is most frequently selected by the viewer as the emphasis item.

14. The display control device according to claim 10, wherein the processor is configured to specify an item selected by the viewer first as the emphasis item.

15. The display control device according to claim 1, wherein the operation history includes a history of display operations of displaying an item of the profile information.

16. The display control device according to claim 15, wherein the processor is configured to specify an item having a longest display time as the emphasis item.

17. The display control device according to claim 1, wherein the processor is configured to, in a case where the emphasis item is an image, perform the display control by performing a control to enlarge and display the image.

18. The display control device according to claim 1, wherein the processor is configured to, in a case where the emphasis item is an image, perform a control to increase the number of images to be displayed, on a list screen displaying images of a plurality of users.

19. The display control device according to claim 1, wherein the processor is configured to further perform a control to display information indicating an item specified as the emphasis item.

20. A non-transitory computer readable medium storing a display control program causing a computer to execute a process, the process comprising:
    specifying an emphasis item that a viewer viewing profile information of a first user desires to emphasize out of the profile information, the first user using a service with which the profile information is registered, from an operation history of the viewer, and
    performing a display control of displaying the emphasis item with priority over other items, in a case where the viewer views profile information of a second user.

* * * * *